Sept. 13, 1938.  E. J. FRANWICK  2,130,083
DENTAL ARTICULATOR
Filed Sept. 30, 1936   3 Sheets-Sheet 1
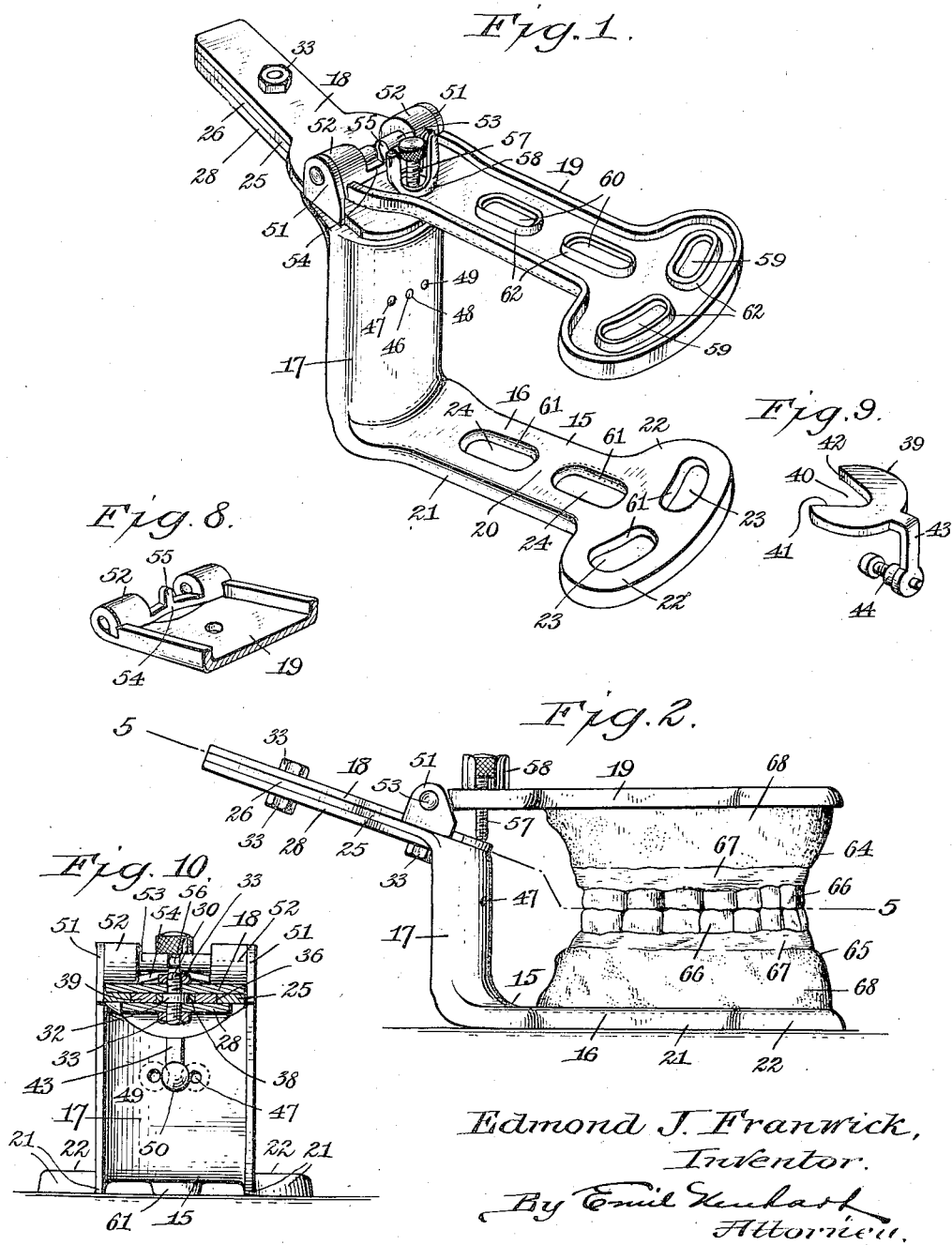

Sept. 13, 1938.  E. J. FRANWICK  2,130,083
DENTAL ARTICULATOR
Filed Sept. 30, 1936  3 Sheets-Sheet 2
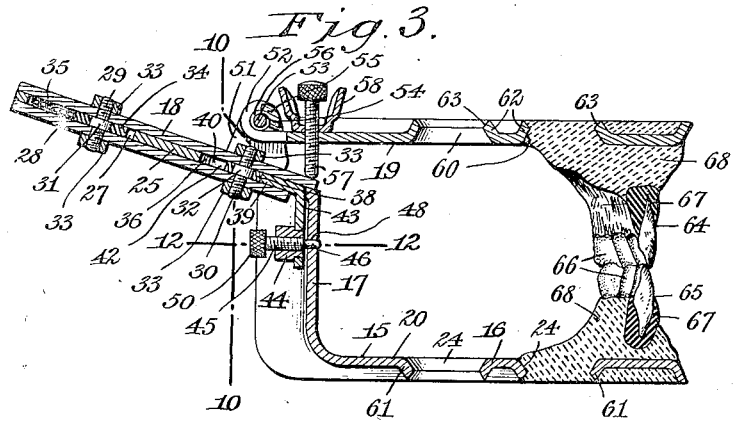

Sept. 13, 1938.  E. J. FRANWICK  2,130,083
DENTAL ARTICULATOR
Filed Sept. 30, 1936  3 Sheets-Sheet 3
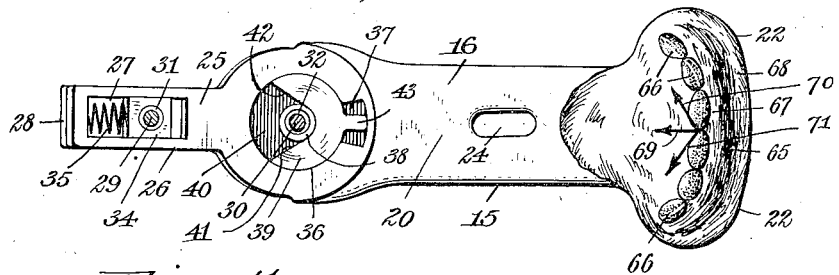
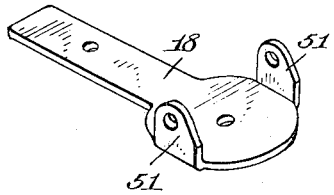
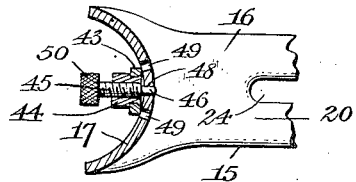
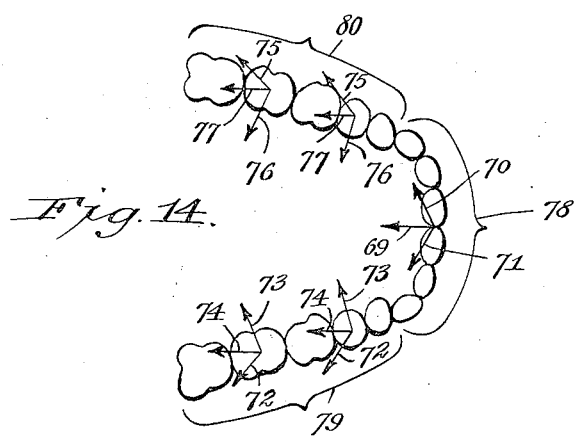
Edmond J. Franwick, Inventor.
By Emil Kuhart
Attorney Patented Sept. 13, 1938

2,130,083

UNITED STATES PATENT OFFICE 2,130,083

DENTAL ARTICULATOR

Edmond J. Franwick, Buffalo, N. Y., assignor to Hanau Engineering Company, Inc., Buffalo, N. Y., a corporation of New York Application September 30, 1936, Serial No. 103,381

6 Claims. (Cl. 32—32)

My invention relates to a dental articulator, and more particularly to one adapted for crown and bridge work.

The primary object of my invention is to provide a simple and inexpensive articulator which is sturdy in structure, precise in action, and designed more particularly for setting up and grinding in partial restorations of the mouth, such as "crown and bridge" work.

Another object of this invention is to provide an articulator which consists of comparatively few parts, and in which the dentures, partial dentures, or models can be mounted kinematically proper and the equivalents of the movements of the human jaw effected on the three main regions of the dental arch, under three simple adjustments of the device; that is, the bicuspid and molar region at the right side of the dental arch, the anterior region, and the bicuspid and molar region at the left side of the dental arch.

A further object of my invention is to provide an articulator in which the main parts can be in the form of metal stampings, more particularly sheet brass or similar non-corrosive sheet material, and wherein the main parts are connected together to permit relative movements thereof by means of constrained path surfaces for effecting protrusive and/or lateral movements of an anterior restoration fastened to one part thereof, and under adjustment, lateral movements with component protrusive movements of restorations for other selected portions or regions of the dental arch.

While this invention is particularly designed for partial restorations, such as crown and bridge works, its function, when adjusted for symmetrical movement (required for anterior restorations), will be such that full dentures could be applied thereto and, under adjustment of the device, the working and balancing strokes required for other regions of the dental arch would be in the proper directions, or in other words, in such directions as executed in the mouth.

The above mentioned and other objects of my invention are realized by embodying means in an articulator for connecting the upper jaw member of the device to the lower jaw member in a novel manner, and simultaneously providing a riding or path surface for the upper jaw member under control of an adjustable element, whereby opening and protrusive movements of said upper jaw member are permitted and lateral movements are effected in accordance with the adjustments desired for either left or right side restorations, or for anterior restorations, depending on which part of the dental arch the restoration is to be made.

The invention consists in supporting one denture, partial denture, or model, in a fixed position and surmounting the other in a manner to allow movements of the latter toward and from the first-mentioned denture, or model, while limiting said other denture, or model in its movements along a single inclined riding or path surface furnishing bearing therefor.

The invention also consists in supporting the partial dentures, or models, last mentioned and providing an adjuster, which, in the embodiment of my invention shown is in the form of a cam, will cause the upper jaw member to effect lateral movements of the denture, or model carried thereby componently with upward and downward movements, or what may be termed protrusive movements.

The invention further consists in the simplified construction of the various parts comprising the articulator, and in the combining of such parts in a manner to effect movements which are the equivalent of the mandibular movements of a human jaw.

The invention still further consists in the novel features of construction and in the arrangement and combination of parts to be hereinafter described and more particularly pointed out in the subjoined claims.

It may here be stated that my improved articulator provides for protrusive, and right and left lateral excursions to produce the harmony and co-ordination required for a successful restoration; a simple shifting of the adjuster only being necessary to adjust the device for a restoration in the anterior region, or in the right or left side of the arch. Moreover, by use of this device, grinding of the restoration after insertion in the mouth is reduced to the minimum, if not entirely eliminated.

In the drawings,

Fig. 1 is a perspective view of an articulator embodying my invention, prepared for dentures, partial dentures, or models to be operated upon.

Fig. 2 is a side elevation of the articulator, showing full dentures applied to the upper and lower jaw members of the device.

Fig. 3 is a vertical longitudinal section taken centrally through the articulator, dentures, or models, of the anterior region of a dental arch being shown secured to the upper and lower jaw members of the device.

Fig. 4 is a plan view of the device.

Fig. 5 is a longitudinal section, taken on line

5—5, Fig. 2, showing the cam device adjusted to effect relative lateral movements and protrusive movement of dentures, or models of restorations at the right side of a dental arch so as to effect movements equivalent to the mandibular movements of a human jaw.

Fig. 6 is a similar view adjusted to effect movements equivalent to the mandibular movements at the left side of a dental arch.

Fig. 7 is a similar view showing the cam device adjusted to central position and showing the lower anterior region of a dental arch, or model, mounted thereon.

Fig. 8 is a sectional perspective view of the pivoted inner end of the upper jaw member.

Fig. 9 is a detached perspective view of the adjuster element or cam.

Fig. 10 is a vertical transverse section, taken on line 10—10, Fig. 3.

Fig. 11 is a detached perspective view of the slide member to which the upper jaw member is pivotally connected.

Fig. 12 is a horizontal section, taken on line 12—12, Fig. 3.

Fig. 13 is a perspective view of the spring employed for retaining the upper jaw member in centric relation.

Fig. 14 is a view showing a lower dental arch and illustrating the symmetrical movements taking place in the anterior portion of the arch and the working and balancing strokes in the bicuspid and molar regions thereof.

Referring now to the drawings in detail, like numerals of reference refer to like parts in the several figures.

The reference numeral 15 designates the lower jaw member of the articulator. It comprises a base 16 and a standard or arm 17 rising or extending from the rear end of the base at a right angle thereto. While this member is referred to as the lower jaw member and is designed to receive or carry whole or partial dentures, or models, of a lower dental arch, and also to carry the upper jaw member of the device, the element 17 thereof may be referred to as a support for the reason that on it is supported a slide member 18 to which the upper jaw member 19 of the articulator is secured, as will appear hereinafter. The lower jaw member may be constructed in any approved manner, but I preferably form the same of sheet brass or other sheet metal stamped to provide the base 16 with a flat or face portion 20, the marginal portions of which are bent downwardly to form flanges 21 which may rest upon a table or other support and hold the flat or face portion 20 in spaced relation to the surface of the table or support. In some instances, however, the user will operate the device by grasping a jaw member in each hand, without otherwise supporting the device.

The base 16 is long and narrow and the front end thereof is laterally extended or widened, as at 22, and given an arcuate formation to conform more or less to the curvature of the anterior portion of a human jaw. This laterally extended or widened portion is provided with key-openings 23 which are transversely arranged and spaced apart, preferably equal distances from the longitudinal center of the base. Other key-openings 24 are formed in the base 16 in rear of the laterally widened front end 22 and trend longitudinally therein. The flat or face portion 20 of the base is curved upwardly at its rear end and the flanges 21 thereof are continued upwardly in a similar manner, the upward extension of said flat or face portion and said flanges merging to give the standard or arm 17 a parti-circular or concavo-convex form in cross section. At the upper end of this standard or arm an upwardly and rearwardly inclined extension 25 is formed which is of substantially circular formation at its front end and of a diameter approximating the transverse measurement of the standard or arm 17, which, by reason of the formation described, is concavo-convex in cross section. The inclined extension 25 has its longitudinal center co-incident with that of the base 16.

The upwardly and rearwardly-inclined extension 25 is narrowed at its rear end, as at 26, and provided centrally with a longitudinal opening or slot 27. The upper side of this extension serves as a rider surface on which the slide member 18 is positioned for movement longitudinally thereon, or for such movement with component lateral movements in opposite directions.

Bearing against the under side of the upwardly and rearwardly-inclined extension 25 is a retainer plate 28 held in place by screw-studs 29, 30. These screw-studs are provided with enlarged medial portions 31, 32, respectively, which form opposite outwardly-facing shoulders and are of a length slightly greater than the thickness of the upwardly and rearwardly-inclined extension 25, or guide member as it may be termed. The end portions of these screw-studs are passed through openings in the retainer plate 28 and slide member 18, and nuts 33 are threaded onto the opposite ends thereof to maintain the retainer plate 28 in properly spaced relation to the slide member 18; said retainer plate bearing against the lower outwardly-facing shoulders of said screw-studs and the slide member 18 against the upper outwardly-facing shoulders so that when tightening the nuts against said retainer plate and slide member, both will be given freedom of movement and be positively retained on the inclined guide member 25; the retainer plate being movable with said slide member.

Within the elongated opening or slot 27 of the inclined guide member 25 is a slide element or block 34 through which the enlarged intermediate portion of the screw-stud 29 is passed, and arranged in said opening or slot between the rear or upper end wall thereof and the slide block 34, a spring 35 is arranged, one end of which bears against said wall and the other against said slide block to maintain the latter against or in close proximity to the lower or forward end of said opening or slot. This construction provides what may broadly be termed a pin-and-slot connection.

Arranged concentrically in the circular front portion of the inclined guide member 25 is a comparatively large circular opening 36, and extending forwardly and downwardly from this opening is a radial extension 37, the outer or front wall of which is curved in an arc of a circle having the center of the opening 36 as its axis, said front wall being in line or approximately in line with the concaved inner or rear surface of the standard or arm 17.

Surrounding the enlarged medial portion of the screw-stud 30 is a roller-bushing 38 which is of a length slightly less than the said enlarged medial portion, so that the retainer plate 28 and the slide member 18 do not clamp against the ends of said bushing. The roller-bushing is therefore free to rotate on the enlarged intermediate portion of said screw-stud. In the circular opening 36 of the inclined guide member 25, an adjuster in the form of a parti-circular cam 39 is positioned, this cam having a substantially V-shaped notch 40 extending forwardly and downwardly from its edge at a point rearward of its axis and terminating in a semi-circular axial portion into which the roller-bushing 38 fits. The side walls of this notch therefore flare rearwardly and upwardly from the said roller-bushing, as at 41, 42, and it is to be noted that the bolt 30 and roller-bushing 38 are always maintained in the longitudinal center of the device and the bolt therefore has a fixed position. Extending forwardly from this parti-circular cam is an angular adjuster-arm 43, one portion of which is in the plane of the cam proper and the other disposed at an obtuse angle thereto; said latter portion lying against or in close proximity to the concaved rear surface of the standard or arm 17. This cam is therefore rotatably adjustable within the standard or arm 17, and more particularly within the circular opening 36 formed in the inclined guide-member 25. One portion of the angular adjuster-arm 43 is positioned within the radial extension 37 of the circular opening 36 and the other is in a depending position lying within the concavo-convex standard or arm proper.

To the lower end of the angular adjuster-arm 43 an internally-threaded bushing 44 is secured, through which is passed a lock-pin 45 having a threaded portion adjustable within said bushing and a reduced unthreaded lock-terminal 46 adapted to be projected forwardly from the angular adjuster-arm so as to enter any one of a plurality of pin-receiving apertures formed transversely in the standard or arm 17; three in number being preferably provided and designated by the numerals 47, 48, 49. Said lock-pin has a head 50 at its rear end by which it can be easily manipulated to withdraw the lock-terminal 46 thereof from the pin-receiving aperture in which it may have been entered, or to enter said terminal into any selected aperture.

The slide member 18 is laterally widened at its front end and given a substantially circular formation in this area so as to fully cover the substantially circular front end of the inclined guide member 25 and the adjuster or cam 39 fitted thereinto. At opposite sides of said circular formation, upstanding ears 51 are provided between which is pivotally arranged the rear end of the upper jaw member 19 of the device.

The upper jaw member, in the main, conforms in structure and outline to the base 16 of the lower jaw member, with the exception that at its inner or pivoted end it is provided with two spaced-apart pivot-receiving sleeves 52 through which a pivot-pin 53 is passed which is secured within the said upstanding ears 51.

In the preferred form of my invention, the upper jaw member is also stamped of sheet brass or other similar sheet material, and said pivot-receiving sleeves 52 are formed by cutting out a portion of the sheet material near its rear end and curving the so-fashioned end to form said pivot-receiving sleeves 52, with the cut-out portion between them. By thus cutting out a portion of the metal, a connector bar 54 is provided between the pivot-receiving sleeves 52. A lip 55 extends from this connector bar and is pressed into a circumferential groove 56 formed in the pivot-pin 53 centrally between the two pivot-receiving sleeves 52, thus locking said pivot-pin against movement lengthwise and preventing accidental detachment of the upper jaw member from the remainder of the device.

The pivotal connection of the upper jaw member just described enables the latter to be easily removed, since it is only necessary to deflect the lip 55 forwardly and upwardly a sufficient distance to disengage it from the groove 56 in the pivot-pin, after which the pivot-pin can be easily withdrawn from the upstanding ears 51 on the slide member 18.

For the purpose of properly positioning the upper jaw member with respect to the lower, and to set said upper jaw member at any desired spacing that may be found necessary, an adjusting screw 57 is threaded through the upper jaw member at its pivoted end and a thumb lock-nut 58 applied to this screw, which, after adjusting the latter, may be threaded firmly against the upper surface of said upper jaw member to lock the adjusting screw in desired position. The lower end of this adjusting screw engages the upper surface of the slide member 18 near its front end.

Key openings 59, 60 are formed in the upper jaw member, similar to the key openings 23 and 24 in the lower jaw member. The openings 23 and 24 in the lower jaw member have downwardly-directed flanges 61 around the same, and those of the upper jaw member similar flanges which are, however, directed upwardly, as at 62. As clearly shown in Fig. 3, these flanges are undercut at their edges, as at 63, for a purpose to appear hereinafter. Partial dentures, or models 64, 65 are mounted respectively on the under side of the upper jaw member and upper side of the lower jaw member. The teeth 66 of these dentures, or models, may be fastened in a layer of wax 67 attached to a body or base of gypsum, or other suitable foundation or bonding material 68, capable of being worked upwardly into the openings 59 and/or 60 of the upper jaw member, and downwardly into the openings 23 and/or 24 of the lower jaw member, the gypsum or other material forming these bases being retained or keyed by the flanges 59 and 60 of the openings in said jaws. By reason of the under-cut edges provided on these flanges, the gypsum or other material employed for bonding the dentures, or models, to the jaws will be permitted to extend over the under-cut edges and prevent withdrawal from the jaw members. Such under-cut edges enable the gypsum or other bonding material used to be smoothened so as to provide surfaces for such material which do not extend beyond the flanges of said openings, yet assure a secure locking of the dentures, or models, in the jaw members of the device.

It will be apparent from the foregoing that I have perfected a simple and effective articulator in which comparatively few parts are employed, and after securing dentures, or models, to the jaw members, the upper jaw member may be opened and closed and either jaw member moved in protrusive and in right and left lateral directions, giving the balancing and working strokes which are necessary for shaping the masticatory surfaces of the teeth to harmonize with any individual's requirements.

To make a restoration of the anterior portion of the dental arch where the movements are symmetrical, as shown by the arrows in Figs. 7 and 14, designated 69, 70, and 71, the adjuster or cam device is adjusted centrally within its receiving opening 36 with the angular arm thereof positioned centrally along the standard or arm 17 so that the lock-pin 45 is entered in the center pin-receiving aperture 48 in said standard or arm. When so positioned, the V-shaped notch 40 in the adjuster or cam device is disposed in the longitudinal center of the articulator, or in central position; and at such times, during the manipulation of the articulator, the adjuster or cam device permits the symmetrical movements necessary for anterior restorations. With the articulator adjusted as stated, the jaw members may be moved relatively to effect a movement which is equivalent to opening the mouth, due to the pivotal connection between the two, and either jaw member may be given a protrusive movement, as indicated by the arrow 69, and left and right lateral movements, as indicated by the arrows 70 and 71, respectively, componently with the protrusive movement for operating upon a denture forming, or a model of the anterior portion of the dental arch which may be mounted on the articulator in the position shown in Fig. 7. When applying the anterior portions of dental arches to the segmental or widened front ends of the jaw members, such arch portions are positioned centrally with respect to the key openings 59 and 61 in the upper and lower jaw members, respectively, so that three incisors are at opposite sides of the longitudinal center of each jaw member. Under this arrangement the angular movements are balanced at opposite sides of said longitudinal center.

To effect a restoration of the right side of the dental arch, the adjuster or cam device is adjusted to the right, as shown in Fig. 5, and retained in such position for manipulation of the articulator. It should be noted that while so adjusted, the working and balancing strokes of the right and left lateral movements for a right side restoration are as shown by the arrows 72, 73 in said figure; 72 designating the working stroke, and 73 the balancing stroke. In this figure I have shown associated with the arrows 72 and 73 a third arrow 74 indicating the protrusive movement which may be effected independently of the left and right lateral movements, or componently therewith. In the said figure, two sets of said arrows are shown; one in the molar region and the other in the bicuspid region, and upon comparison of these two sets of arrows it will be noted that the working stroke indicated by the arrow 72 in the bicuspid region, is at a slightly different angle than that indicated by the arrow 72 in the molar region; angularity of the working stroke in the bicuspid region with respect to the longitudinal center of the articulator being greater than in the molar region. This is also true of the balancing stroke indicated by the arrow 73.

To effect a restoration on the left side of a dental arch, the partial dentures, or models, are mounted in the articulator as shown in Fig. 6, and the adjuster or cam device moved to the left, as shown in said figure, where it is retained for manipulation of the device. It is to be noted that the movements for a left side restoration are exactly similar to those for the right side restoration shown in Fig. 5, with the exception that the direction of the working and balancing strokes are reversed. In the two sets of arrows shown in this figure, 75 designates the direction of the working stroke, 76 the direction of the balancing stroke, and 77 the direction of the protrusive movement.

The various directions of movement effected by this improved articulator are clearly illustrated in Fig. 14, wherein is shown the divergence of the angles of the working and balancing strokes which take place in each of the three regions of a dental arch. In this figure the teeth embraced by the bracket 78 include those of the anterior region, those embraced by the bracket 79 the teeth at the right side of a dental arch, and those embraced by the bracket 80 the teeth at the left side of the dental arch.

The teeth of the anterior region, when operated upon, are placed in the articulator in the same position as shown in Fig. 14, and those at the right and left sides of the dental arch in slightly different positions than shown in Fig. 14. The mounting of the side partial dentures on the articulator is made on a line which could be termed the longitudinal axis of the articulator; and as the angularity of the teeth at the sides of dental arches vary in human jaws, so attaching the partial dentures to the articulator greatly simplifies the preparation and "set-up" of the dentures, or models, for operation.

It will be noticed, upon comparing Fig. 14 with Figs. 5 and 6, that the right and left sides of a dental arch are normally disposed in lines converging forwardly, in contra-distinction to the approximate centrally-mounted positions shown in Figs. 5 and 6. To compensate for this difference between the normal positions of the side portions of dental arches in the human jaw and the positions in which they are secured to the articulator, the angularity of the walls of the V-shaped notch 40 in the adjuster or cam device is sufficiently great to effect movements of the dentures, or models, which are the equivalents of the mandibular movements of a human jaw. Moreover, the inclination of the guide 25 also enters into consideration for such compensation. By reason of such arrangement it is only necessary to position the side portions of a dental arch centrally on the jaws, and the manner of connecting the two jaw members together and effecting the protrusive and relative lateral movement, assures movements of the teeth which are the equivalent of those of the human jaw for which the teeth restorations are to be made.

It is to be noted that the rearwardly-inclined extension or guide member 25 provides an inclined riding face or surface, and through the attachment of the slide member thereto by means of the pin-and-slot connection and the interposition of the cam and its associated bolt or pin having the roller thereon, the slide member is constrained in its movements; and due to the connection of the upper jaw member thereto the relative movements of the jaw members of the articulator are constrained to such as are the equivalents of the mandibular movements of a human jaw, selectively effected in accordance with the restorations to be made.

Where, in the claims, the term "denture" or "dentures" is employed, it is intended to mean whole or partial dentures, unless specifically otherwise referred to.

While this articulator is not designed for full dentures or models, gypsum or other suitable foundations may be made sufficiently large to hold complete dentures or models in proper position on both the upper and lower jaw members of the device.

Having thus described my invention, what I claim is:

1. An articulator comprising two spaced-apart jaw members, one jaw member surmounting the other and the lower having an upstanding arm at its rear end and an upwardly and rearwardly-inclined extension at the upper end of said arm, said extension having a slot at its upper end and a circular opening at its front end provided with a radial forward extension, said upstanding arm having a multiple of openings therein, a slide member mounted on said extension and having the upper of said jaws pivotally connected to its front end, an adjuster rotatable in said circular opening and having an adjuster-arm entered in the forward extension thereof and extended downwardly in rear of said first-mentioned arm, means carried by said adjuster-arm for selectively entering said transverse series of openings in accordance with the adjustment given said adjuster, means carried by said slide member passed through the slot of said extension to permit longitudinal movement of said slide member on said extension, and means passed through said circular opening and said adjuster for controlling the relative lateral movements of the jaw members according to the adjustment given said adjuster.

2. An articulator comprising two spaced-apart jaw members, one of said jaw members surmounting the other and the lower having an upstanding arm at its rear end of concavo-convex formation in cross section and an upwardly and rearwardly-inclined extension at the upper end of said arm, said extension having a slot at its rear end and a circular opening at its front end provided with a radial forward extension, said arm having a transverse series of three openings therein, a slide member mounted on said extension and having the upper of said jaws pivotally connected to its front end, a slide block within said slot spring-pressed forwardly and downwardly, a parti-circular cam within said opening having a V-shaped notch therein and an adjuster-arm entered in said radial extension and extending downwardly in rear of said transverse series of openings, a lock-pin carried by said arm adapted to enter any of said series of openings upon rotation of said cam, means for pivotally connecting said slide member with said slide block, and a pin carried by said slide member passed through the V-shaped notch of said parti-circular cam and adapted for controlled movement therein to effect lateral movements equivalent to the lateral movements of a human jaw, the walls of said V-shaped notch determining the maximum degree of said lateral movements by contact of said pin with the walls thereof.

3. An articulator comprising two spaced-apart jaw members, one of said members having an arm at its rear end disposed at an angle thereto and provided at the extremity of said arm with an upwardly and rearwardly-inclined extension, a slide member adapted for sliding movement on said extension and having pivotal connection with the other of said jaw members, a retainer plate in slidable connection with the under side of said extension, connecting means carried by said slide member and said retainer plate to connect the two together, said inclined extension being provided with adjustable means equipped with angular contact areas along either of which said connecting means contacts and through which said connecting means are passed to effect relative movements of said jaw members equivalent to mandibular movements of a human jaw.

4. An articulator comprising two spaced-apart jaw members, one of said jaw members having an arm extending at a right angle thereto at its rear end and said arm having an upwardly and rearwardly-inclined extension, a slide member adjustably mounted on said extension to selectively permit movements equivalent to the protrusive and lateral movements of a human jaw, for the anterior region of a dental arch, the bicuspid and molar regions at the right side of a dental arch, or the bicuspid or molar regions at the left side of a dental arch, said slide member having spaced-apart upstanding ears and the other of said jaw members having spaced-apart pivoted sleeves and a cut-out portion adjacent its inner end between said sleeves forming a connecting bar between the latter, said connecting bar having a lock-lip extending therefrom, and a pivot-pin passing through said sleeves and said ears and having a circumferential groove centrally between said sleeves receiving the lock-lip of said connecter bar to prevent accidental disconnection of said last-mentioned jaw member from said slide member.

5. In an articulator, two spaced-apart jaw members adapted to have models of partial dentures mounted thereon, one of said jaw members surmounting the other and the lower having an upstanding arm at its rear end provided at its extremity with an upwardly and rearwardly inclined extension, means at the upper or rear end of said extension for guiding one of said jaw members longitudinally, and an adjustable element at the lower or front end of said extension furnishing a rearwardly and upwardly opening V-shaped notch the angularity of the walls of said notch being varied with respect to the longitudinal center of the articulator upon movement of said adjustable element and serving to govern the lateral movements of said jaw members relatively.

6. In an articulator, two spaced-apart jaw members adapted to have models of partial dentures mounted thereon, one of said jaw members surmounting the other and the lower having a central upstanding arm at its rear end provided at its extremity with an upwardly and rearwardly inclined extension, means at the upper or rear end of said extension for guiding one of said jaw members longitudinally and allowing the same pivotal movement, and an adjustable element at the front end of said extension having a rearwardly and upwardly opening V-shaped notch, the angularity of the walls of said notch being varied with respect to the longitudinal center of the articulator upon movement of said adjustable element and serving to govern the lateral movements of said jaw members relatively, said relative lateral movements being variable under adjustment of said adjustable element.

EDMOND J. FRANWICK.